May 5, 1959
R. J. LEMP
2,885,579
MOTIVE MEANS AND DRIVE THEREFOR
Filed April 18, 1956
2 Sheets-Sheet 1
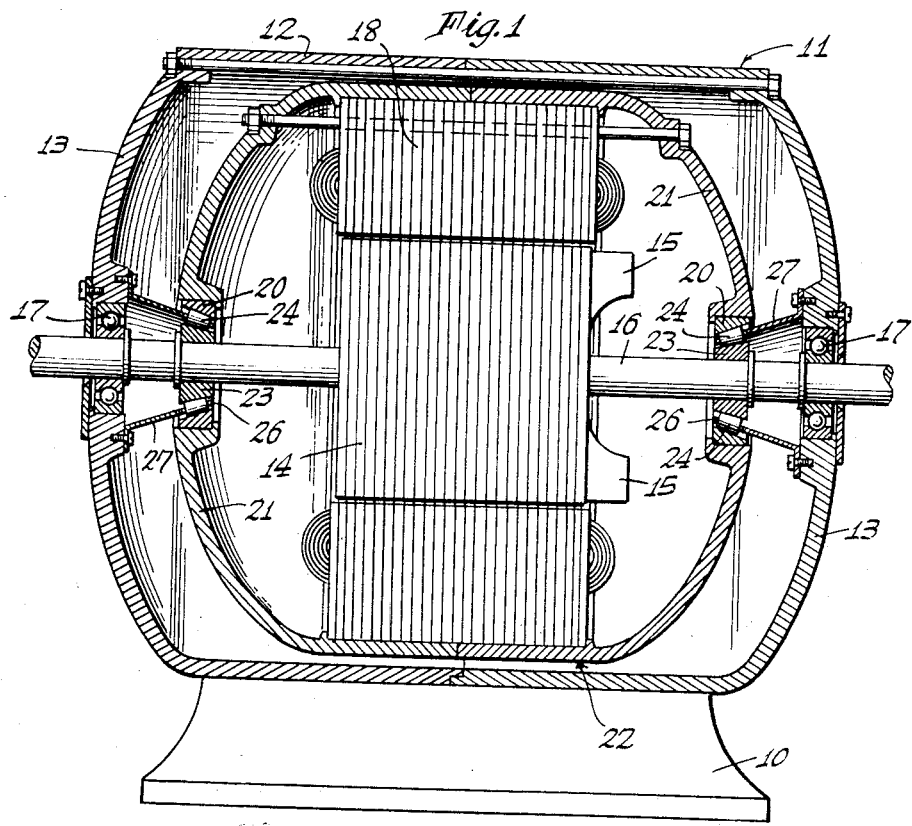
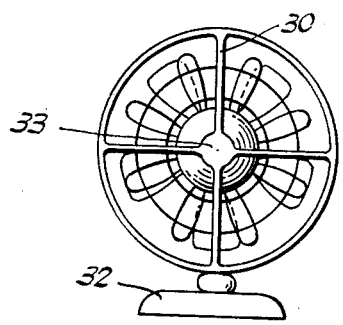
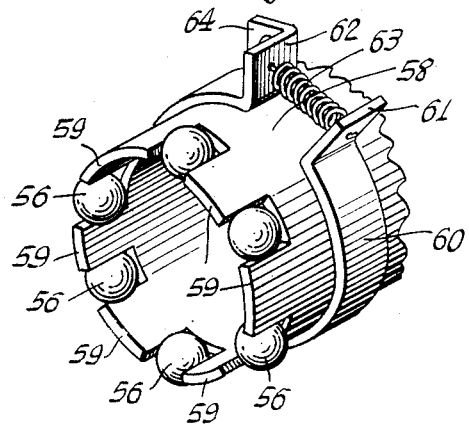
INVENTOR.
Robert J. Lemp
BY
Munn, Liddy, Nathanson & March
ATTORNEYS May 5, 1959  R. J. LEMP  2,885,579
MOTIVE MEANS AND DRIVE THEREFOR
Filed April 18, 1956  2 Sheets-Sheet 2
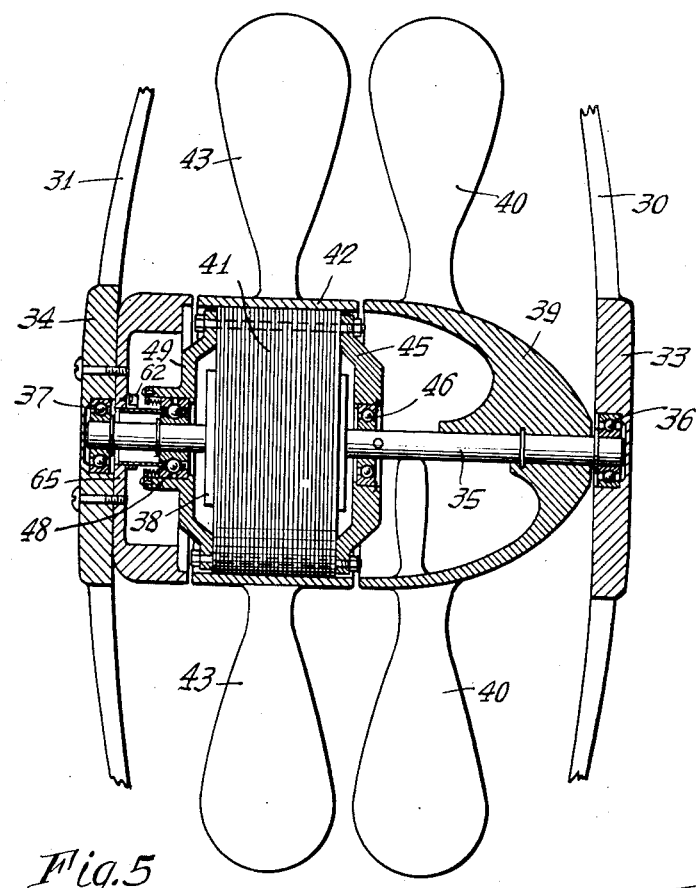
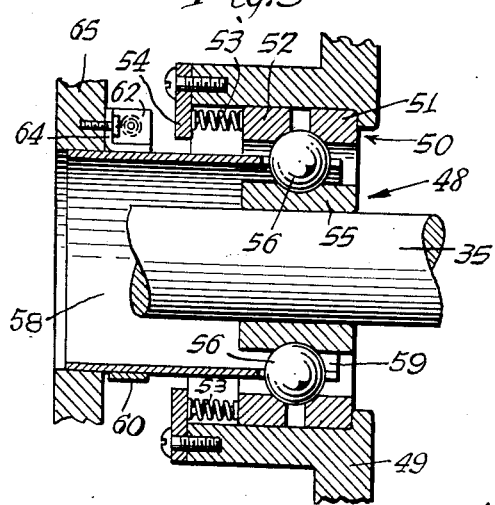
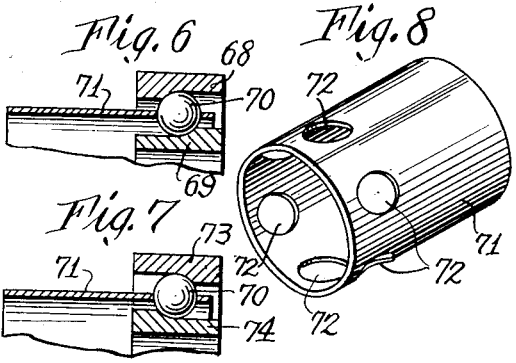
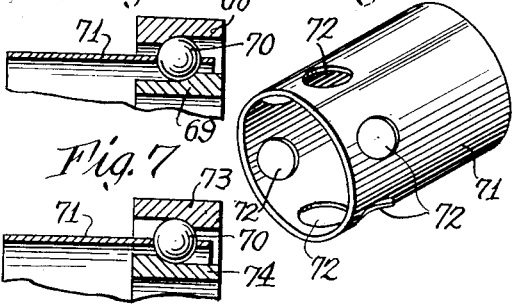
INVENTOR.
Robert J. Lemp
BY
Munn, Liddy, Nathanson & March
ATTORNEYS United States Patent Office 2,885,579
Patented May 5, 1959

2,885,579

MOTIVE MEANS AND DRIVE THEREFOR

Robert J. Lemp, Sayville, N.Y.

Application April 18, 1956, Serial No. 579,050

4 Claims. (Cl. 310—120)

This invention relates to motive means, and more particularly to a combination of motive means and mechanical transmission or power take-off, for the purpose of accomplishing useful work.

The invention is shown as applied to motive means in the form of electric motors; however, it should be understood that the invention is not limited to the specific embodiments illustrated and described herein, since it has utility in connection with motive means generally, as for example gasoline engines, turbines, and the like.

An object of the present invention is to provide an improved motive means and power take-off therefor, which will provide an increased and large torque and a maximum power output, for a given power input.

Another object of the invention is to provide an improved motive means and power transmission, which will provide an advantageous mechanical advantage in the form of a speed reduction without resorting to gears, belts and pulleys, worms or other conventional or well-known reducing movements.

A further object of the invention is to provide an improved motive means and power transmission, which in part is inherent in and utilizes the antifriction bearing structure usually provided for supporting rotating members.

Still another object of the invention is to provide a novel and improved motive means and power transmission, which is of especial advantage and utility where two balanced or substantially balanced loads are to be handled.

A feature of the invention resides in the provision of a novel antifriction bearing means, in conjunction with a motive mechanism, by which an advantageous reduction of speed and increase in torque is possible through utilization of said bearing means as part of the power transmission.

Yet another object of the invention is to provide an improved motive means and power transmission as above set forth, which is relatively simple in construction, requiring few parts of simple manufacture, is effective and reliable in its operation at all times, and has features of ease of assembly and economy of manufacture.

Other features and advantages will hereinafter appear.

In the drawings accompanying this specification, similar characters of reference indicate corresponding parts wherever possible in the several views, in which:

Fig. 1 is an axial vertical sectional view of an improved electric motor and power transmission made in accordance with the invention;

Fig. 2 is an elevational view of an electric fan or blower, incorporating an electric motor and power transmission made in accordance with the invention and illustrating a modification thereof;

Fig. 3 is a vertical axial sectional view of the electric motor and transmission means utilized in Fig. 2;

Fig. 4 is a perspective view showing details of the antifriction-bearing means and constraining device associated therewith, for preventing translational movement of said bearing means; and Fig. 5 is an axial sectional view of a roller bearing assemblage showing a type of pre-loaded or stressed bearing as used in the device of Fig. 3.

Fig. 6 is a fragmentary sectional view of another type of bearing and cage structure as provided by the invention.

Fig. 7 is a fragmentary sectional view of still another type of bearing and cage structure as provided by the invention.

Fig. 8 is a perspective view of a cage structure of the type shown in Figs. 6 and 7.

Referring to Fig. 1, the improved motor and power transmission shown therein comprises a base 10 on which there is carried a stationary outer shell or casing 11 of conventional annular construction, having substantially cylindrical side walls 12 and cupped end walls 13. Mounted within the casing 11 is a motor armature or rotor 14 which may, for example, be of conventional squirrel-cage construction, with fan blades 15 and a shaft 16, the latter passing out through the end plates 13 of the casing 11 and being supported therein by usual, anti-friction ball-bearing assemblages 17.

Also within the casing 11 there is provided a stator structure 18, for cooperation with the armature or rotor 14. The stator structure 18 may, for example, be of the split-phase type having both starting and running windings, as is usual when the motor is of the induction type.

The stator 18 is not rigidly affixed to the outer shell or casing 11 but instead is rotatable therein about the same axis as the armature 14.

In accordance with the present invention I provide novel antifriction bearing assemblages connected between the rotor 14 and stator 18 by which the latter is carried for rotary movement and is enabled to impart torque or turning force to the rotor shaft 16, in addition to the turning force imparted thereto by the rotor 14. Thus I am enabled to provide a power output on the shaft 16 which results not only from turning of the rotor 14 but also from turning of the stator 18, with accompanying benefits and advantages of increased efficiency in the transmission of power, elimination of separate gears, gear boxes, pulleys and belts, and the like, and utilization (but with slight change) of the existing antifriction bearing assemblages such as are commonly employed for mounting rotatable machine parts.

In accomplishing this, I provide outer bearing races 20 rigidly carried by end plates 21 of an inner shell structure 22 in which the stator 18 is secured, and provide inner bearing races 23 on the shaft 16, rigidly affixed thereto in the usual manner. Disposed between the outer races 20 and inner races 23 I provide antifriction roller bearing means 24 adapted to engage said races and maintain the same in spaced relation while providing for virtually frictionless relative turning movement thereof. The antifriction bearing means 24 may comprise tapered roller bearings as shown in Fig. 1, or they may comprise ball bearings as will be later described, or other types of rotary antifriction bearing members. As shown in Fig. 1, each of the tapered roller bearings 24 is disposed between a pair of tapered prongs 26 which extend along the surface of an imaginary cone. The prongs 26 may be carried by stationary collars 27 extending around the main motor shaft 16, said collars being secured to the end plates 13 by bolts or other suitable means, and with the prongs 26 constituting stationary cages.

By virtue of the above construction the roller bearings 24 are free to turn but are constrained against translational movement. Accordingly, any turning movement of the rotor 14 will be accompanied by a corresponding and opposite turning movement of the stator 18, and vice versa. It will be readily understood, therefore, that forces acting on the stator 18 and causing turning thereof will cause turning of the shaft 16 regardless of turning forces which may be imparted to the rotor 14 by the magnetic flux. Thus, power is delivered to the shaft 16 not only from the armature or rotor 14 (which is caused to turn when the motor is energized), but also from the stator 18 since the latter is also caused to turn oppositely, due to the reactive forces of the magnetic flux tending to cause rotor rotation.

I have found that where the loading of the rotor and stator (the latter acting through the roller bearings 24) is balanced, there will be little if any tendency for the roller bearings to move translationally about the shaft 16, and accordingly but little load will be imposed on the prongs 26 which carry the roller bearings 24 and constrain translational movement thereof. In the event of an unbalance in the loading of the rotor and stator, the prongs 26 will be called on to carry correspondingly greater loads, but in any case they are made sufficiently strong to carry the rollers 24 for all load conditions of the motor, without likelihood of their failing.

It will be understood that, by virtue of the stator 18 rotating in a direction opposite to that of the rotor 14 there will result a decrease in the speed of the motor shaft 16. The reason for the decrease of shaft speed is due to the fact that the mass of the stator is being driven. I prefer to make the antifriction bearings comprising the races 20, 23 and the rollers 24 of the preloaded type, wherein the rollers have continual force exerted on them by the races, thereby obviating slippage and obtaining a true rolling action. In consequence of this, I have found that an efficient and effective power transmission is established from the stator 18 to the shaft 16, whereby an appreciable amount of torque may be transmitted to the latter without unduly loading the bearing assemblage or causing slippage of the rollers 24 thereof.

The loading of the rollers 24 may, for certain conditions, be adjusted to permit slippage when the work loads exceed a certain value, thereby to produce a constant torque effect. At the instant that the work load is lessened or released, the slippage will cease and normal rotation of the stator and rotor will be resumed.

It will be understood that the various wires from the windings of the stator 18 may be brought out to slip rings for engagement with brushes carried by the casing 11, for the purpose of providing energization to the stator. Since such construction may be of the conventional type and forms no part per se of the present invention, it is not shown herein.

A modification of the invention is illustrated in Figs. 2–5, which show an electric motor utilized in a fan, for imparting movement to air, said motor having an antifriction bearing power transmission utilizing ball bearings which are constrained against translational movement.

Referring to Fig. 3, the fan structure shown comprises front and rear skeleton frames or spiders 30 and 31 carried by a base 32 and having hubs 33 and 34 respectively. Rotatably mounted in the hubs 33 and 34 is a motor shaft 35 which is carried in antifriction bearing assemblages 36 and 37. The shaft 35 carries a motor armature or rotor 38, and also has a streamlined hub 39 provided with fan blades 40 of relatively small pitch and area.

As provided by this invention, there is rotatably mounted on the motor shaft 35 a stator 41 which is cooperable with the rotor 38. The stator 41 has a casing 42 provided with relatively large, scoop-type fan blades 43 which may be advantageously formed integral with the casing. As shown, the casing 42 is in direct contact with the laminations of the stator 41, and accordingly there is an extremely effective and efficient transfer of heat from the stator to the fan blades 43, and consequent dissipation of heat by the latter. The stator 41 has an end plate 45 carrying an antifriction bearing 46 engaging the shaft 35, to provide for the rotary mounting of the stator.

In accordance with the present invention I provide a power-transmitting antifriction bearing 48 at the rear of the stator, said bearing being carried by a rear end plate 49 and having a split outer race 50 composed of two sections 51 and 52, the latter being yieldably urged by springs 53 backed up against an anchor plate 54. The bearing 48 further comprises an inner race 55 carried by the shaft 35, and a series of balls 56 engaging the said races and maintaining the same in spaced relation.

I further provide, in accordance with this invention, and as shown in Fig. 4, a constraining means for the ball bearings 56 in the form of an annular friction clutch member 58 having prongs 59 extending between the ball bearings 56. The member 58 and prongs 59 take the place of the usual cage which is ordinarily provided in ball bearing assemblages. Surrounding the member 58 I provide a discontinuous, friction collar 60 having ends 61 and 62 which are spring-urged together by a helical extension spring 63. The collar end 62 has an apertured lug 64 by which it may be secured to a stationary casing member 65 mounted on the rear hub 34 of the fan spider structure 31.

The friction collar 60 is normally so tensioned by the spring 63 that it holds the clutch member 58 stationary, together with the prongs 59, thereby constraining the balls 56 against translational movement in the same manner that the prongs 26 of the motor of Fig. 1 constrain the rollers 24 against translational movement.

It should be understood that variations in the structure of the cage 26, 27 of Fig. 1 and the cage 58, 59 of Figs. 3–5 may be utilized without departing from the spirit of the invention.

For example, in place of the prongs 59 of the cage 58, 59 there may be provided spindles carrying additional rollers, which would then engage the rollers 24.

While by way of example I have shown herein roller bearings 24 and ball bearings 56, all other types of rolling-friction bearings may also be used, as for instance, double row ball bearings, barrel roller bearings, straight roller bearings, split outer-race bearings, etc.

It will be understood that slip rings and brushes may be provided respectively on the stator 41 and casing member 65 to bring in current to the stator. Since details of such current conducting means are well understood in the art and form no part per se of the present invention, they are not shown herein.

With the above construction the fan blades 40 and 43 may be so organized and arranged that, in conjunction with the antifriction bearing power transmission 48, the load imposed on the rotor 38 and the stator 41 will be virtually balanced. For such condition there will be little if any tendency for the ball bearings 56 to move translationally, and accordingly but a small amount of work will be required of the prongs 59 and clutch member 58 to keep the antifriction balls in their allotted positions. As in the first embodiment of the invention described, both the rotor 38 and the stator 41 of the motor shown in Fig. 3 deliver power for impelling the air, the movements of the rotor and stator being coupled efficiently and effectively by means of the power transmitting bearing 48. By virtue of the slower actual turning movement of each of the sets of blades 40, 43, larger blade areas may be utilized with a consequent increase of efficiency and reduction of noise. Moreover, no appreciable or measurable losses are introduced by virtue of the antifriction speed reduction or coupling provided by this invention, nor are there required such things as separate gear trains, gear boxes, pulleys and belts, and the like, which entail additional expense, require additional lubrication and in many instances cause an appreciable and objectionable noise.

Considering the motor structure shown in Fig. 3, I have found by actual test that if the fan blades 40 and 43 are omitted and a friction brake placed on the shaft 35, the brake could be readily adjusted to stall the shaft when the stator 41 is held against turning and the constraining clutch member 58 is allowed to turn freely. In other words, by such arrangement the motor functions in the conventional manner and is unable to turn the shaft 35, due to the brake load imposed thereon. However, with the same stalling brake load, when the clutch member 58 is locked against turning and the stator 41 allowed to rotate, the shaft may be easily turned upon the application of the same voltage to the motor windings. This clearly demonstrates the increased torque output developed by my improved motor construction set forth above. If, instead of the friction brake on the shaft 35 the fan blades 40 are provided, they may be made to rotate at a greater speed and move more air when the stator 41 is allowed to turn (without blades) and the clutch member 58 locked, than when the clutch 58 is allowed free rotation and the stator 41 maintained stationary (the latter arrangement corresponding to the conventional motor function, as currently in use).

Referring to Figs. 6 and 8, in place of the bearing power transmission 48 of Fig. 5, there may be provided angular contact bearing races 68 and 69, in conjunction with ball bearings 70 and a tubular cage 71 having apertures 72 receiving the balls 70. It will be also understood that, for the races 68 and 69, races 73 and 74 may be substituted as shown in Fig. 7.

It will be understood that, by the present invention and in accordance with the above disclosed structure, I have provided a novel and improved, efficient and extremely effective motive and transmission means by which increased torque and a speed reduction may be obtained without the use of the usual gearing, belts and pulleys, or the like. The structures as above set forth are extremely simple, economical to manufacture and reliable in operation at all times. No appreciable wear is experienced by the antifriction transmission means, other than the wear normally expected for such means.

Variations and modifications may be made within the scope of the claims and portions of the improvements may be used without others.

I claim:

1. A motive device comprising a pair of rotatable, cooperable driving structures having substantially a common axis of rotation, said structures rotating in opposite directions in response to common opposing forces exerted thereon; bearings connected between said structures, including a pair of rotary races attached respectively to said driving structures; rotary antifriction bearing means engaging said races, maintaining the latter in spaced relation during relative turning movement thereof; a stationary support means and constraining means connected with the support means, holding said bearing means against translational movement while enabling the same to turn in response to opposite turning movements of said races and driving structures, the yieldable connection between said constrained means and support means enabling said constrained means to have restrained turning movement in response to application thereto by said bearing means of forces in excess of a predetermined value.

2. A motive device comprising a pair of rotatable, cooperable driving structures having substantially a common axis of rotation, said structures rotating in opposite directions in response to common opposing forces exerted thereon; bearings connected between said structures, including a pair of rotary races attached respectively to said driving structures; rotary antifriction bearing means engaging said races, maintaining the latter in spaced relation during relative turning movement thereof; a stationary support means and constraining means connected with the support means, holding said bearing means against translational movement while enabling the same to turn in response to opposite turning movements of said races and driving structures, the yieldable connection between said constrained means and support means enabling said constrained means to have restrained turning movement in response to application thereto by said bearing means of forces in excess of a predetermined value, said yieldable connection comprising a slipable clutch having relatively movable friction members engaging each other.

3. A motive device comprising a pair of rotatable, cooperable driving structures having substantially a common axis of rotation, said structures rotating in opposite directions in response to common opposing forces exerted thereon; bearings connected between said structures, including a pair of rotary races attached respectively to said driving structures; rotary antifriction bearing means engaging said races, maintaining the latter in spaced relation during relative turning movement thereof; a stationary support means and constraining means connected with the support means, holding said bearing means against translational movement while enabling the same to turn in response to opposite turning movements of said races and driving structures, the yieldable connection between said constrained means and support means enabling said constrained means to have restrained turning movement in response to application thereto by said bearing means of forces in excess of a predetermined value, said driving structures having load imposing means providing loads thereon of commensurate values.

4. A motive device comprising a pair of rotatable, cooperable driving structures having substantially a common axis of rotation, said structures rotating in opposite directions in response to common opposing forces exerted thereon; bearings connected between said structures, including a pair of rotary races attached respectively to said driving structures; rotary antifriction bearing means engaging said races, maintaining the latter in spaced relation during relative turning movement thereof; a stationary support means and constraining means connected with the support means, holding said bearing means against translational movement while enabling the same to turn in response to opposite turning movements of said races and driving structures, the yieldable connection between said constrained means and support means enabling said constrained means to have restrained turning movement in response to application thereto by said bearing means of forces in excess of a predetermined value, said anti-friction bearing means comprising a plurality of rolling members spaced apart circumferentially of the races, said constraining means comprising a member having prongs disposed between said rolling members and constituting a controlling cage therefor; a yieldable connection between said constraining means and support means comprising a clutch surface on the said member having prongs, and a friction collar surrounding and engaging said clutch surface and normally frictionally holding said member having prongs against turning movement.

References Cited in the file of this patent

UNITED STATES PATENTS

| | | |
|---|---|---|
| 671,662 | White | Apr. 9, 1901 |
| 1,351,999 | Heath | Sept. 7, 1920 |
| 1,946,919 | Smitmans | Feb. 13, 1934 |
| 2,429,061 | Hunter | Oct. 14, 1947 |
| 2,462,182 | Guerdan et al. | Feb. 22, 1949 |

FOREIGN PATENTS

| | | |
|---|---|---|
| 812,088 | France | Jan. 27, 1937 |